United States Patent [19]

Dalton

[11] 4,149,561
[45] Apr. 17, 1979

[54] VALVE ACTUATOR

[75] Inventor: Thomas B. Dalton, Muskegon, Mich.

[73] Assignee: Westran Corporation, Muskegon, Mich.

[21] Appl. No.: 892,278

[22] Filed: Mar. 31, 1978

Related U.S. Application Data

[63] Continuation of Ser. No. 687,010, May 17, 1976, abandoned.

[51] Int. Cl.² .............................................. F16k 37/00
[52] U.S. Cl. ................................. 137/556; 74/89.15; 74/424.8 VA; 251/229; 251/279
[58] Field of Search ................. 74/424.8 VA, 424.8 R, 74/89.15; 251/58, 229, 279, 280, 307; 137/556

[56] References Cited

U.S. PATENT DOCUMENTS

| | | | |
|---|---|---|---|
| 2,167,321 | 7/1939 | Abercrombie | 137/556 |
| 3,063,298 | 11/1962 | Elliott | 251/229 |
| 3,204,920 | 9/1965 | Generke | 251/279 |
| 3,318,171 | 5/1967 | Wilkinson et al. | 251/229 |
| 3,415,275 | 12/1968 | Berggren | 137/556 |
| 3,452,766 | 7/1969 | Fenster | 251/229 |
| 3,464,669 | 9/1969 | Henrion | 251/307 |
| 3,575,378 | 4/1971 | Fawkes | 251/229 |
| 3,877,677 | 4/1975 | Daghe | 251/229 |
| 4,008,877 | 2/1977 | Yasuoka et al. | 251/229 |
| 4,023,432 | 5/1977 | Killian | 74/424.8 R |

Primary Examiner—Martin P. Schwadron
Assistant Examiner—G. L. Walton
Attorney, Agent, or Firm—Gifford, Chandler, VanOphem, Sheridan & Sprinkle

[57] ABSTRACT

A valve actuator is provided for use in conjunction with a valve having a rotatable member the rotation of which actuates the valve in dependence on the direction of rotation. The valve actuator comprises a housing and a coupling member rotatably carried by the housing and coaxially attached to the valve rotatable member. An elongated threaded shaft is rotatably mounted within the housing so that the axis of the shaft is perpendicular to and spaced from the axis of the coupling member. A nut member threadably engages the threaded shaft and a link is pivotally secured at one end to the nut member and at its other end to a radially extending portion of the coupling member. The link prevents rotation of the nut member on the threaded shaft so that rotation of the shaft axially drives the nut member along the shaft. An axial displacement of the nut member along the shaft in turn rotates the valve rotatable member via the link and the coupling member.

6 Claims, 2 Drawing Figures

4,149,561

VALVE ACTUATOR

CROSS REFERENCE TO RELATED APPLICATION

This application is a continuation of application Ser. No. 687,010 filed May 17, 1976, now abandoned.

BACKGROUND OF THE INVENTION

I. Field of the Invention

The present invention relates to a valve actuator and, more particularly, to a valve actuator for use with a valve having a rotatable member, the rotation of which actuates the valve.

II. Description of the Prior Art

There are a plurality of previously known valve actuators for use in conjunction with a valve having a rotatable member the rotation of which actuates the valve. For example, such valve actuators are typically used for valves on oil pipe lines or the like.

With such valves, a relatively great amount of torque must be applied to the valve rotatable member in order to initiate the opening of, or to "break", the valve. The additional torque necessary to break the valve results from encrusted deposits on the valve members and also from the natural compressive forces present at the complete opening or closure of the valve.

Heretofore, in order to generate a torque sufficient to break the valve, very large diameter handwheels have been secured to the valve actuator. While these previously known large diameter handwheels are adequate to break and actuate the valve, they are undesirable for a number of reasons.

One disadvantage of these previously known handwheels is that such handwheels are necessarily expensive to manufacture and involve high material costs due to their size.

A still further disadvantage of these previously known handwheels is that such handwheels are bulky and cumbersome to transport and handle, particularly when a single handwheel is intended to be sequentially attached to a plurality of different valve actuators.

SUMMARY OF THE PRESENT INVENTION

The valve actuator of the present invention overcomes the above-mentioned disadvantages of the previously known valve actuators by providing an improved valve actuator of simple and low cost construction and yet which is capable of transmitting a high torque to a valve rotatable member without the necessity of a large diameter handwheel.

In brief, the valve actuator of the present invention comprises a housing rotatably supporting a coupling member which is coaxially attached to the valve rotatable member. An elongated threaded shaft is also rotatably carried by the housing so that the axis of the shaft is perpendicular to but spaced from the axis of the rotatable member.

A nut member threadably engages the shaft and a link is pivotally secured on one end to the nut and at its other end to a radially extending portion of the coupling member. The link prevents rotation of the nut member on the shaft so that rotation of the shaft by a small diameter handwheel axially moves the nut member along the shaft. In turn, the axial movement of the nut member rotates the coupling member via the link and the radially extending portion of the coupling member.

Due to the relatively small axial travel of the nut member per revolution of the threaded shaft and because of the leverage provided by the link, a relatively small force applied to the handwheel is transformed into a large rotational torque and applied to the valve rotatable member via the link and the coupling member. With the valve actuator of the present invention, the torque applied to the valve rotatable member is sufficient to break or initiate the opening of most valves without the necessity of a large diameter, and consequently cumbersome and expensive, handwheel.

BRIEF DESCRIPTION OF THE DRAWINGS

The valve actuator of the present invention will be more clearly understood upon reference to the following detailed description when read in conjunction with the accompanying drawing wherein like reference characters refer to like parts throughout the several views and in which.

DETAILED DESCRIPTION OF THE PRESENT INVENTION

Figure 1:
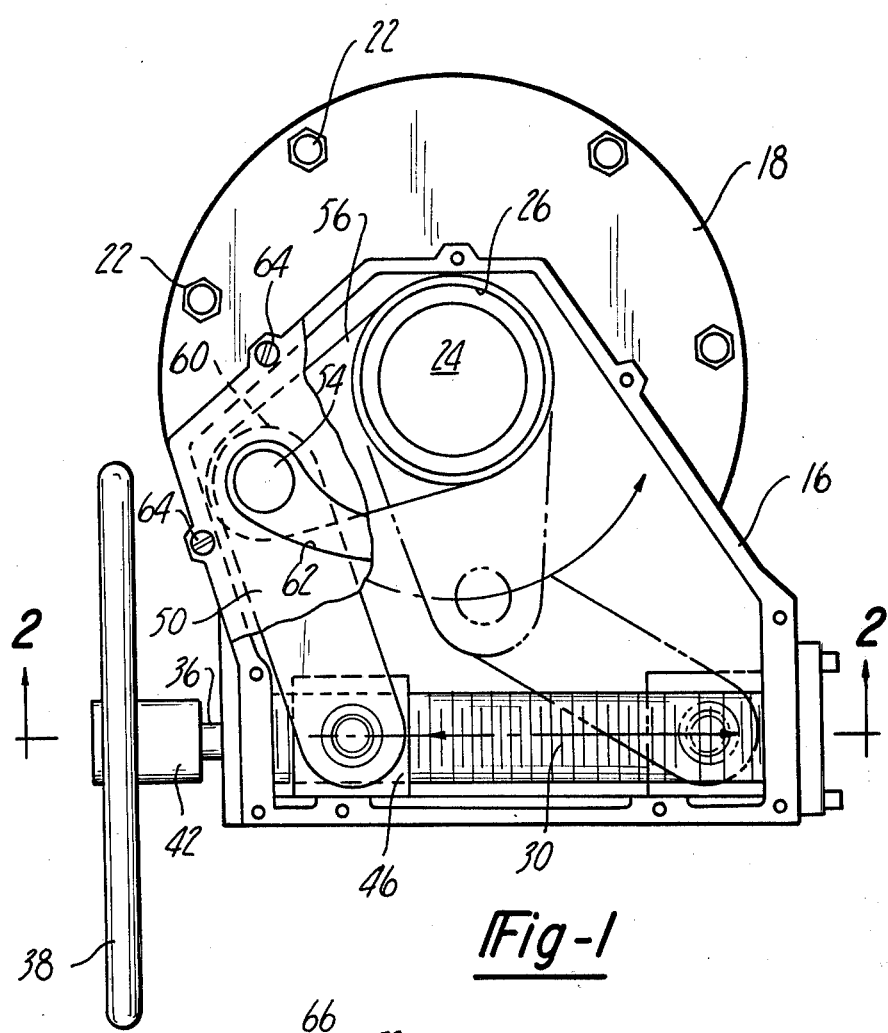
FIG. 1 is a top plan view showing the valve actuator of the present invention.
Figure 2:
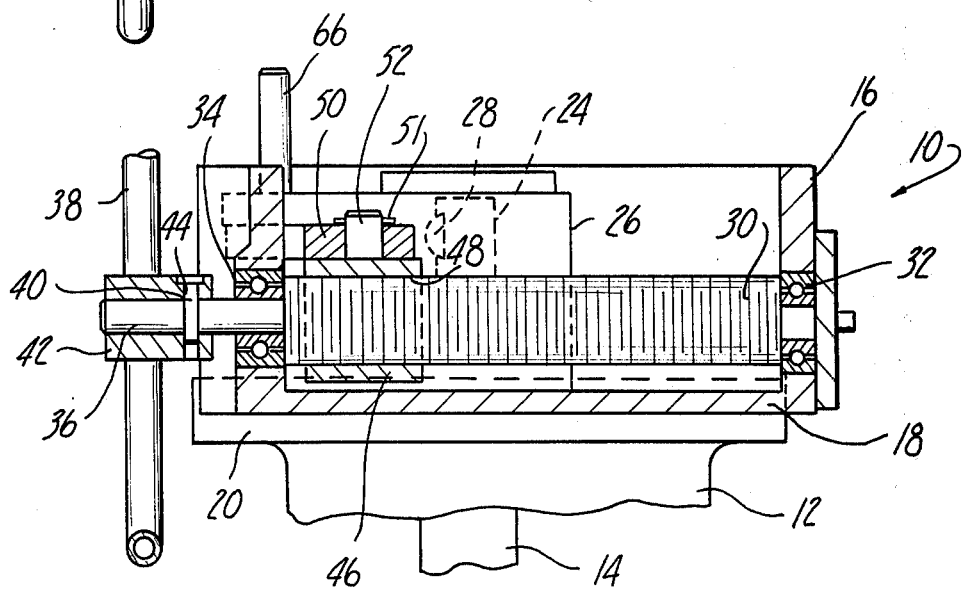
FIG. 2 is a cross-sectional view of the valve actuator of the present invention taken substantially along line 2—2 in FIG. 1.

With reference to the drawing, the valve actuator 10 of the present invention is thereshown mounted onto a valve 12 which is only partially shown as it forms no part of the present invention. The valve 12 includes a rotatable member 14, the rotation of which actuates the valve 12 in dependence upon the direction of rotation of the rotatable member 14.

The valve actuator 10 includes a housing 16 having a mounting flange 18 secured to a mounting flange 20 on the valve 12 by bolt members 22 or the like. With the mounting flanges 18 and 20 secured together, the upper end 24 of the rotatable member 14 is received within the interior of the housing 16. A coupling member 26 having a radially extending portion 56, is rotatably carried within the housing 16 by any appropriate means, and is coaxially secured to the upper end 24 of the member 14 by a Woodruff key 28 or the like. Thus, rotation of the coupling member 26 in turn rotates the member 14 and actuates the valve 12.

A threaded shaft 30 is rotatably mounted by bearings 32 and 34 within the housing 16 so that the axis of the shaft 30 is perpendicular to but spaced from the axis of rotation of the rotatable member 14. A portion 36 of the shaft 30 extends outwardly from the housing 16 and receives the hub 42 of a small diameter handwheel 38 thereon. Any conventional means, such as a pin 40 extending through the hub 42 of the handwheel 38 and a bore 44 in the outwardly extending portion 36 of the shaft 30, lockingly secures the handwheel 38 to the shaft 30.

A nut member 46 having internal threads 48 is disposed around and threadedly engages the shaft 30 within the housing 16. An upwardly extending cylindrical pin 52 is formed from or secured to the nut member 46.

A link 50 is pivotally secured at one end by the pin 52 and a snap ring 51 to the nut member 46 and at its other end by a pin 54 to the radially extending portion 56 of the coupling member 26. In addition, the link 50 is arranged such that the link 50 lies in substantially a radial plane of the rotatable member 14.

The link 50 prevents the rotation of the nut member 46 relative to the shaft 30 and is disposed such that initial rotation of the handwheel 38 is multiplied by the link 50 to provide an initial breaking force on the member 14. Thus as shown in FIG. 1, rotation of the shaft 30 in a clockwise direction moves the nut member from the position shown in solid line to the position shown in phantom line. The axial displacement of the nut member 46 along the shaft 30 in turn rotates or pivots the coupling member 26 with the attached rotatable member 14 in a counterclockwise position as viewed in FIG. 1 which accordingly actuates the valve 12.

The link 50 is moved from the leverage producing, pivoted position shown in solid lines to the extended position shown in phantom lines.

Preferably a cover 60 having an arcuate slot 62 formed therethrough is secured to the open end of the housing 16 by screws 64, or the like, and serve to prevent foreign debris from accumulating within the housing 16. An indicator rod 66 extends upwardly from the radial portion 56 of the coupling member 26 through the arcuate slot 62. The rod 66 provides an indication of the degree of opening or closure of the valve 12 in dependence on the circumferential position of the rod 66 within the slot 62 and the proper indicia (not shown) may be imprinted on the cover 60 adjacent the slot 62 for this purpose.

It will be appreciated that the axial displacement of the nut member 46 along the shaft 30 is relatively small for each rotation of the shaft 30. Thus a relatively small rotational force applied to the shaft 30 via the handwheel 38 results in the application of a large torque force to the coupling member 26 and hence to the attached rotatable member 14. The link 50 multiplies this force during initial opening of the valve and upon closing the valve and thereby eliminates the necessity of the previously known large diameter handwheels.

Having thus described my invention, many modifications thereto will become apparent to those skilled in the art to which it pertains without deviating from the spirit of the invention as defined by the scope of the appended claims.

What is claimed is:

1. A valve actuator for use with a valve having a rotatable member the rotation of which actuates the valve, said valve actuator comprising:
   a housing,
   a cover enclosing said housing,
   a coupling member rotatably carried by said housing and coaxially attached to said valve rotatable member, said coupling member having a radially extending portion,
   an elongated threaded shaft rotatably mounted in said housing the axis of said shaft being perpendicular to and spaced from the axis of said coupling members,
   a nut member threadably mounted to said shaft,
   a link pivotally secured at one end to said nut member and at its other end to said radially extending portion of said coupling member,
   said radially extending portion terminating short of said threaded shaft at its closest position to said shaft,
   means for rotating said shaft, and
   an indictor member, said indicator member comprising a rod secured to the free end of the radially extending portion of the coupling member, said rod being substantially parallel to the rotational axis of the rotatable member and extending through an arcuate slot formed in the cover whereby the position of said rod in said slot provides an exteriorly visible indication of the rotational position of the rotatable member.

2. The invention as defined in claim 1 and including an indicator member secured to said radially extending portion of said coupling member and visible exteriorly of said housing to provide an indication of the rotational position of said coupling member.

3. The invention as defined in claim 1 wherein said indicator member comprises a rod extending outwardly from said housing.

4. The invention as defined in claim 1 wherein said nut member includes an upwardly extending pin which is rotatably received through an aperture in said link.

5. The invention as defined in claim 1 wherein said link comprises a single bar pivotally secured around a single pin extending from one side of said nut member.

6. the invention as defined in claim 1 wherein said cover includes position indicia adjacent the arcuate slot formed therein.

* * * * *